Dec. 17, 1935. G. B. HARRISON 2,024,522

COLOR PHOTOGRAPHY

Filed March 31, 1934

Inventor:
Geoffrey Bond Harrison,
By Byrnes, Stebbins & Blenko.
attys.

Patented Dec. 17, 1935

2,024,522

UNITED STATES PATENT OFFICE 2,024,522

COLOR PHOTOGRAPHY

Geoffrey Bond Harrison, Ilford, England, assignor to Dufaycolor Limited, London, England, a British company Application March 31, 1934, Serial No. 718,450
In Great Britain April 6, 1933

3 Claims. (Cl. 95—2)

This invention comprises improvements in or relating to color photography and relates to processes of color photography (particularly color cinematography) of the type in which the original exposure is made through a multi-color screen or reseau on to a sensitized layer on the same or a separate support. In processes of this type it is usual to make the color transmission bands of the several colors of the screen as wide as is possible consistent with an approximate rendering of the colors in the picture in order that the exposure required for the taking of the picture may be as short as possible. In practice it is usually found necessary to make the color transmission bands of the several screen colors so wide that they overlap to some extent.

Photographs of this type may be reproduced on similar multi-color screen material or they may be reproduced by preparing a series of color separation records each corresponding to one of the part-records produced by the colors of the screen and then combining these color separation records to form a single picture in color.

When multi-color screen material is used for the making of copies, it is found, in order to reduce the opacity of the screen as much as possible so as to get bright copies, desirable that the color transmissions of the several screen colors should also be as wide as possible and should overlap to some extent. In practice it is impossible when using screens with very small elements to superimpose the original and copy materials for the purpose of reproduction sufficiently accurately to ensure exact registration of the elements of the two screens. The patterns on the screens have necessarily to be very fine indeed, especially in the case of cinematograph films. In these circumstances it is found that the overlapping parts of the color transmission bands of the screen colors result in degradation of the colors of the copy, since, considering for simplicity the case of a single color element in the original—say a red element—if there is lack of registration between the two screens the light transmitted by that element cannot fall wholly, and may not fall in part, on the area of a red element of the copy, but will fall at least in part on an element of different color. If the red element falls on an element of the copy material which has a component of color transmission which overlaps the transmission of the red element, then this common component will affect the sensitive material behind the element on the copy and will produce a false color record.

This effect also occurs if a diffused or duplicated image of each element of the original is produced on the copy during printing as has been suggested in order to ensure that each element of the original falls on at least one element of corresponding color in the copy. Various methods of producing such a diffused or duplicated image have been proposed, for example in British specification No. 374,891.

Similarly, when the original color-screen record is printed on to plain material to form color separation records using for each record light of color corresponding to the color of one of the screen elements, then these separation records are not accurate copies of the original records formed behind the screen elements of the several colors of the master screen since the printing light which should only be transmitted by screen elements of one color is also partly transmitted by screen elements of another color.

A further reason why it is desirable that the color transmission bands of the screen elements of the copy material should be as wide as possible, is that it is necessary that the finished record should transmit the maximum possible amount of light in order to obtain adequate illumination of the screen on which the picture is being shown. In the reproduction of such pictures, however, if ordinary white light is used it is found that further color degradation occurs due to the overlapping transmission bands of the screen elements since, taking for example a part of the picture which should be devoid of green but should contain red and violet, the red and blue-violet elements will each transmit a portion of green.

The object of this invention is to provide a method of improving the production (i. e. the taking or printing) of a color photograph of the kind taken and viewed through a multi-color screen.

The invention accordingly provides the method of producing a colored photograph of the multi-color screen type in which the color transmission bands of the screen color elements overlap wherein the light used for taking or reproducing contains components of color transmitted by each of the different color elements of the screen but contains substantially no component of color which would be transmitted by any two or more screen elements of different color.

The selecting of the color composition of the taking, reproducing or printing light is by analyzing into a spectrum a beam of light containing colors corresponding to the colors of the screen together with colors which are common to two colors of the screen, e. g., a beam of white light, cutting out from the spectrum the colors which are common to two elements of the screen by means of a mask and, if desired, recombining the remaining colors. The mask is first prepared by passing a beam of light (e. g., white light) which includes colors which are common to two colors of the screen through filters corresponding in color overlap to these two colors of the screen, analyzing the remaining colors into a spectrum, photographing the spectrum, and, if necessary, repeating the process with filters corresponding to the color overlap of different combinations of screen colors.

The invention will now be described by way of example with reference to the accompanying diagrammatic drawing, in which—

Like reference numerals indicate like parts throughout the several figures of the drawing.

Figure 1:
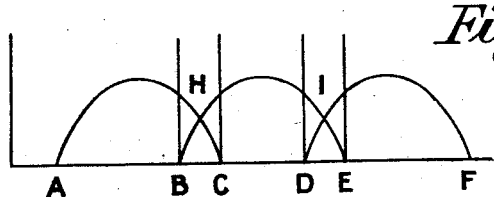
Figure 1 represents the color transmission bands of a three-color screen.

In Figure 1 the curve A—C represents the spectral transmission band of the red elements of a three-color master screen, B—E the spectral transmission band of the green elements of the screen and D—F the spectral transmission band of the blue-violet elements.

It will be seen that the red and green transmissions overlap at B—C and the green and blue-violet transmissions overlap at D—E. Assuming in this example that the master record is being copied onto color screen material and that the transmission of the screen elements of the copy material is similar to that of the master material, then it will be seen that if, during printing, a red element of the master screen falls over a green element of the copy screen a component of the printing light (if ordinary white light is being used) will be passed by both screen elements at BHC and will affect the sensitized material behind the green element of the copy thus producing a false color effect. Similarly, if a green element of the master record falls on a blue-violet element of the copy, then a component of the printing light will pass through both screen elements at DIE and produce a false record. The same of course applies if a blue-violet element of the master falls on a green element of the copy or a green element of the master falls on the red element of the copy.

If, however, the components of color B—C, D—E are omitted from the light used for printing, then these false effects will not occur.

Figure 2:
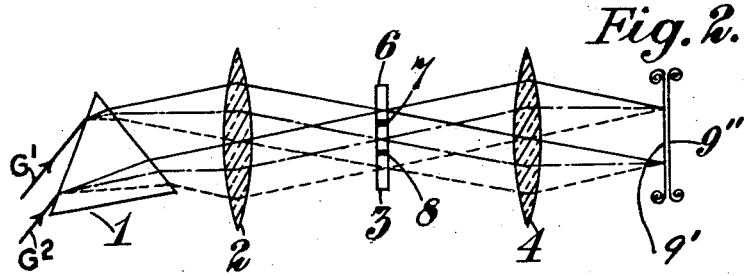
Figure 2 is a diagram illustrating one method of preparing a beam of light of the desired composition.

One way of obtaining light from which these components have been eliminated is shown in Figure 2 in which a beam of parallel white light $G^1$—$G^2$ is analyzed into a pure spectrum by means of a prism 1 and lens 2. The different colors of the spectrum are brought to real foci at 3 and the colors are recombined into a beam of light by means of the lens 4. Placed in the plane of the spectrum at 3 is a mask 6 which has two opaque portions 7 and 8. These opaque portions correspond in position in the spectrum to the colors B—C and D—E in Figure 1 and thus these colors are absorbed by the mask, and the reassembled light leaving the lens 4 contains no components of color corresponding to the portions B—C and D—E and may be used for printing as indicated at 9, where 9' represents the master film and 9" the copy film, which are both on multi-color screen material, and the light passes through the film 9' onto the film 9".

Figure 3:
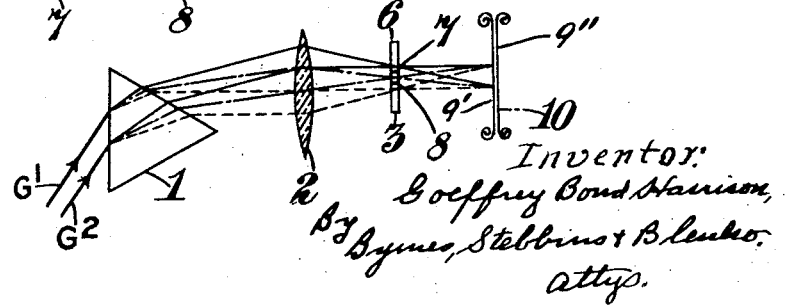
Figure 3 is a diagram illustrating an alternative method of obtaining light of the desired composition.

An alternative method of securing light of the desired composition is shown in Figure 3. In this method the light is analyzed into a pure spectrum at 3, the undesired colors are absorbed by a mask 6 in the manner described above in relation to Figure 2 and the light is arranged in known manner to recombine in the plane 10 where it may be employed for printing in the manner described above with reference to Figure 1.

Figure 4:
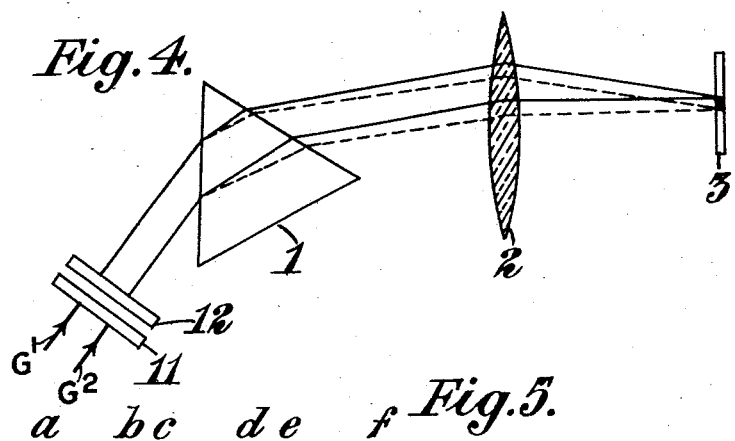
Figure 4 is a diagram illustrating the preparation of the mask.

One way of preparing a mask for use in either of the above methods is shown in Figure 4. In this case a beam of parallel white light $G^1$—$G^2$ is passed through a pair of filters 11 and 12 one of which has a color transmission corresponding to the red elements of the color screen (i. e. A—C in Figure 1) and the other to the green elements of the screen (i. e. B—E in Figure 1). The light leaving the filters therefore corresponds to the component of color common to the red and green elements (i. e. the part BHC in Figure 1). This light is analyzed into its components by means of a prism 1 and the components are brought to real foci at 3 by means of the lens 2. A sensitized photographic plate is placed at 3 and is exposed to the part spectrum thus formed at that plane. The operation is then repeated on the same photographic plate using filters at 11 and 12 corresponding to the green and blue-violet elements of the screen.

Figure 5:
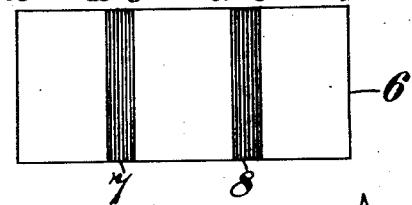
Figure 5 is a mask for use in the methods as shown in Figures 2 and 3.

The photographic plate is then developed producing a mask as shown in Figure 5 having two black bands 7 and 8 corresponding to the portions B—C and D—E in Figure 1. The prism 1 and lens 2 used in this operation of preparing the mask are conveniently those used in the final printing process.

Although the above examples have been described in connection with a three-color screen, the invention may of course equally well be applied to screens having any number of colors, for example two or four color screens. The invention is also equally applicable to regular or irregular screens.

By using a mask of special shape or opacity any desired compensation may be obtained. Thus for example if the red in the finished picture is found to predominate the mask used may be only partly transparent over the red portion of the spectrum or the transparent area in the red region may be reduced in size. Again it is not necessary that the whole of the light passed by combination of two or more elements of the screen should be entirely eliminated. In some cases better results may be obtained by using a partly transparent mask which transmits a proportion of the common light. Again in order to be able to obtain an artificial illumination equivalent to, for example, daylight (e. g. for use in illuminating subjects for the purpose of photographing them by the color screen process) a mask may be used the transparent area of which has been so shaded off or otherwise varied that the spectrum colors are passed in approximately the same proportion as in daylight.

In addition to the color degradation produced during reproduction of a color screen record due to the overlapping transmission bands of the screen elements a certain amount of degradation occurs, from the same cause, during the taking step. It is found that the accuracy of the master record may be improved, in circumstances where it is possible, if the subject is illuminated during taking by light which contains substantially no component of color transmitted by any two screen elements of different color. Such light may, for example, be produced by the method described with reference to Figure 2.

I claim:

1. In the production of a color photograph of the kind taken and viewed through a multi-color screen the steps of passing a beam of light through filtering means the transmission band of which is substantially the same as that of two differently colored elements of the screen when superposed, passing the beam transmitted by the filtering means through a spectroscopic device arranged to analyze the beam into a spectrum, photographing the spectrum to form a mask, and employing the spectroscopic device aforesaid to control the light used for the production of the photograph with the mask aforesaid located in the spectral plane.

2. In the printing of a color photograph of the kind taken and viewed through a multi-color screen from a master photograph of the same kind, the steps of passing a beam of light through filtering means the transmission band of which is substantially the same as that of two differently colored elements of the screen when superposed, passing the beam transmitted by the filtering means through a spectroscopic device arranged to analyze the beam into a spectrum, photographing the spectrum, repeating these steps with filtering means corresponding to each other pair of the colored elements of the screen which have a common transmission of color, thereby to form a mask, and employing the spectroscopic device aforesaid to control the composition of the light used for printing by analyzing a beam of light into a spectrum with the mask aforesaid located in the plane of the spectrum in correct spectral relationship and employing the light passed by the mask for printing the photograph.

3. In the production of a color photograph of the kind taken and viewed through a multi-color screen, the steps of passing a beam of light through filtering means the transmission band of which is substantially the same as that of two differently colored elements of the screen when superposed, passing the beam transmitted by the filtering means through a spectroscopic device arranged to analyze the beam into a spectrum, photographing the spectrum to form a mask, and employing a spectroscopic device adapted to give a spectrum having the same characteristics as that produced by the aforesaid device used in the formation of the mask to control the light used for the production of a photograph with the mask aforesaid located in the spectral plane.

GEOFFREY BOND HARRISON.